United States Patent
Bodén et al.

(10) Patent No.: US 8,936,883 B2
(45) Date of Patent: Jan. 20, 2015

(54) ARRANGEMENT AND METHOD FOR GENERATING HYDROGEN FROM HYDROCARBON FUEL

(75) Inventors: Andreas Bodén, Göteborg (SE); Göran Lindbergh, Vallentuna (SE)

(73) Assignee: Powercell Sweden AB, Göteborg (SE)

( * ) Notice: Subject to any disclaimer, the term of this patent is extended or adjusted under 35 U.S.C. 154(b) by 333 days.

(21) Appl. No.: 13/255,511

(22) PCT Filed: Mar. 10, 2009

(86) PCT No.: PCT/SE2009/000129
§ 371 (c)(1),
(2), (4) Date: Oct. 6, 2011

(87) PCT Pub. No.: WO2010/104421
PCT Pub. Date: Sep. 16, 2010

(65) Prior Publication Data
US 2012/0028145 A1    Feb. 2, 2012

(51) Int. Cl.
*H01M 8/06* (2006.01)
*C01B 3/52* (2006.01)
*C01B 3/34* (2006.01)
*C01B 3/48* (2006.01)

(52) U.S. Cl.
CPC ........... *H01M 8/0612* (2013.01); *C01B 3/348* (2013.01); *C01B 3/48* (2013.01); *C01B 3/34* (2013.01); *C01B 2203/0233* (2013.01); *C01B 2203/0261* (2013.01); *C01B 2203/0288* (2013.01); *C01B 2203/0485* (2013.01); *C01B 2203/066* (2013.01); *C01B 2203/146* (2013.01); *C01B 2203/147* (2013.01); *Y02E 60/50* (2013.01); *C01B 2203/142* (2013.01)
USPC ................ 429/412; 429/425; 423/650; 48/61

(58) Field of Classification Search
None
See application file for complete search history.

(56) References Cited

U.S. PATENT DOCUMENTS

| | | | |
|---|---|---|---|
| 3,619,144 A | | 11/1971 | Bawa |
| 3,847,672 A | * | 11/1974 | Trocciola et al. ............. 429/410 |
| 3,919,390 A | * | 11/1975 | Moore ....................... 423/210.5 |
| 4,086,323 A | * | 4/1978 | Moore et al. ............... 423/210.5 |
| 5,645,802 A | * | 7/1997 | Yanagioka et al. ........... 422/170 |

(Continued)

FOREIGN PATENT DOCUMENTS

| WO | 03042097 A1 | 5/2003 |
|---|---|---|
| WO | 2005107001 A2 | 11/2005 |

(Continued)

OTHER PUBLICATIONS

International Search Report for corresponding International Application PCT/SE2009/000129, Dec. 2009.

*Primary Examiner* — Jonathan Crepeau
(74) *Attorney, Agent, or Firm* — WRB-IP LLP

(57) ABSTRACT

An arrangement and a method are provided for generating hydrogen from hydrocarbon fuel, wherein hydrocarbon fuel is supplied to a fuel reformer for producing hydrogen rich gas including hydrogen, carbon monoxide and possibly unconverted fuel compounds, wherein the amount of carbon monoxide and/or the unconverted fuel compounds is reduced with the help of a molten salt reactor arranged downstream the fuel reformer. An auxiliary power unit including such an arrangement is also provided.

19 Claims, 1 Drawing Sheet

(56) References Cited

U.S. PATENT DOCUMENTS

| | | |
|---|---|---|
| 2004/0043343 A1 | 3/2004 | Kamijo |
| 2004/0091753 A1* | 5/2004 | Terorde et al. ............ 429/12 |
| 2006/0057058 A1 | 3/2006 | Dahl |
| 2007/0287038 A1 | 12/2007 | Lindstrom et al. |
| 2008/0038598 A1* | 2/2008 | Berlowitz et al. ............ 429/17 |

FOREIGN PATENT DOCUMENTS

| | | |
|---|---|---|
| WO | 2006008138 A1 | 1/2006 |
| WO | 2006034086 A1 | 3/2006 |

\* cited by examiner

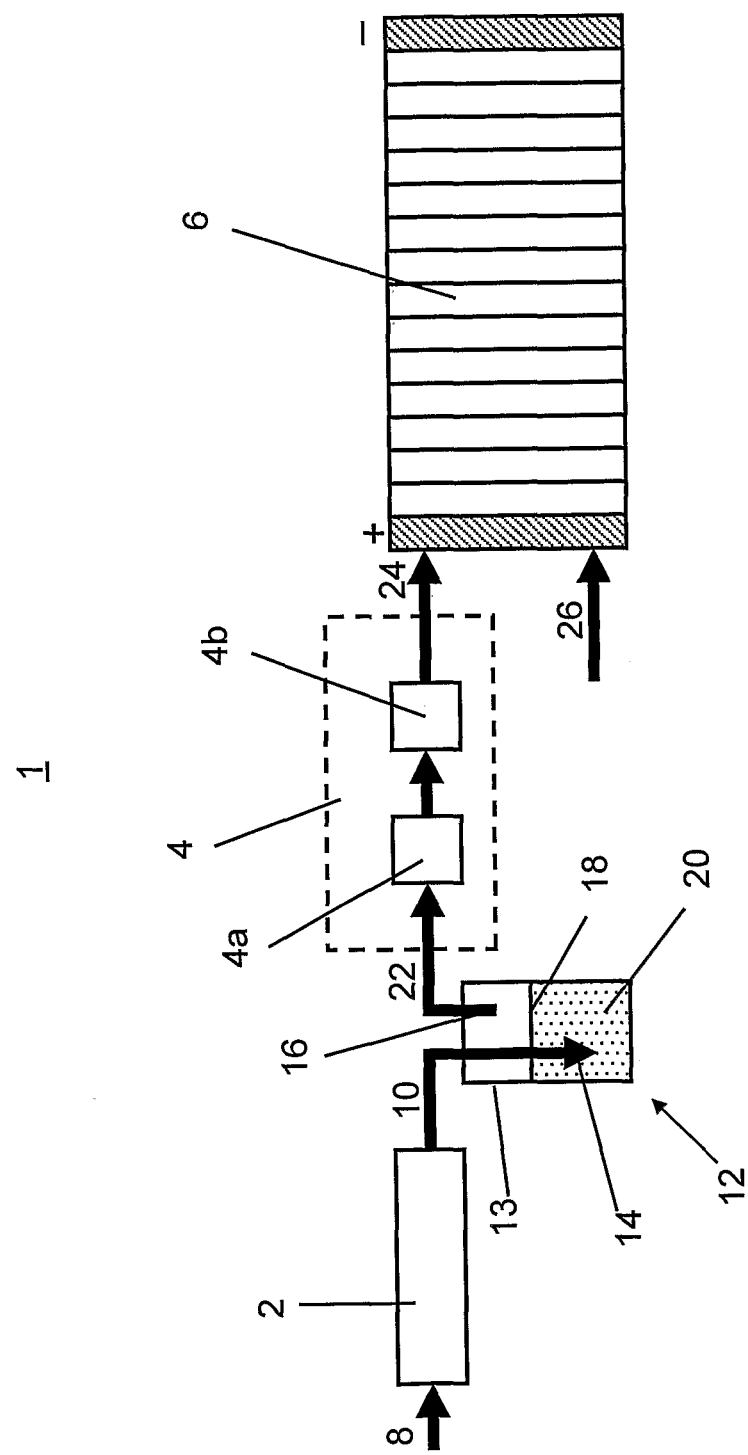

ARRANGEMENT AND METHOD FOR GENERATING HYDROGEN FROM HYDROCARBON FUEL

BACKGROUND AND SUMMARY

The present invention relates to an arrangement and a method for generating hydrogen from hydrocarbon fuel. The arrangement comprises a fuel reformer for reforming hydrocarbon fuel to a hydrogen rich gas comprising at least hydrogen, carbon monoxide and possibly unconverted fuel compounds. The hydrogen gas produced according to the present invention can advantageously be used to operate fuel cells. The present invention also relates to an auxiliary power unit (APU) comprising such an arrangement.

The conversion of hydrocarbon fuels to a hydrogen rich product gas is a central process step in fuel processors as for instance those used in APU systems. APU systems can advantageously be used in vehicles of all kinds as well as in other applications which have a need for off-grid generation of electricity from a main fuel source. For vehicle power trains, liquid or gaseous hydrocarbon fuels like gasoline, kerosene and diesel, but also biogas or other biofuel, can be utilized. It is therefore straightforward, also to use these fuels for the respective APU systems.

For use in APU systems, several fuel cell technologies are appropriate. These are for instance low temperature proton exchange membrane fuel cells (PEMFC), high temperature fuel cells, e.g. molten carbonate fuel cells (MCFC) and solid oxide fuel cells (SOFC). Since high temperature fuel cells can tolerate carbon monoxide (CO) in the feed gas, the hydrogen rich product gas of the fuel reformer reactor can be supplied directly to the fuel cells. In low temperature fuel cells like PEMFC on the other hand, carbon monoxide poisons the catalysts in the electrode of the anode, and, therefore, the CO content in the hydrogen rich product gas of the reformer needs to be reduced prior to entering the fuel cell. This gas treatment ordinarily comprises at least a water-gas shift reactor and/or a final CO remover step, preferably by oxidation, methanation or metal membranes.

The water-gas shift reaction (WGS) is a chemical reaction in which carbon monoxide reacts with water to form carbon dioxide and hydrogen:

$$CO+H_2O \rightarrow CO_2+H_2$$

Thereby, the carbon monoxide amount in the hydrogen rich gas produced by the fuel reformer can be reduced.

For example, US 2007/0287038 describes a method for reforming hydrocarbon fuel for generating hydrogen, wherein after a fuel reformer, which produces the hydrogen rich gas, a gas clean-up reactor is used for removing unwanted by-products such as carbon monoxide. The gas clean-up reactor has a carrier material which is coated with noble metals such as Pt, Ru, Rh and Pd, which react with carbon monoxide, so that the gas stream is purified. Other types of CO oxidizers are described in US 2004/0043343 and WO 2005/107001.

Since most vehicles use liquid hydrocarbons like gasoline, kerosene, or diesel to run their engines, also sulphur compounds, like thiols, thiophenes, organic sulphur compounds or disulphides need to be taken into account. They pose major problems for all catalysts in the system, i.e. the catalysts used for reforming as well as the catalysts in the fuel cell. Therefore, most suppliers for the fuel cells recommend that the total sulphur amount stays well below 1 ppmw (parts per million by weight) in the feed gas. This in turn requires in practice sulphur concentrations in the hydrocarbon fuel fed to the reformer to be in the range of 1 to 10 ppmw, or less.

The removal of sulphur from liquid hydrocarbons down to the aforementioned levels is not trivial and requires severe process conditions, especially for the desulphurization of diesel, which increases the costs for the fuel.

A further problem in the current reformer technology is the conversion of aromatic compounds and long chained carbon compounds comprised in the liquid hydrocarbon fuel. Aromatic compounds can also be formed during the reforming process if the required operating conditions of the reforming process are not or not perfectly met. Mostly, the reforming is performed according to the chemical reactions:

$$C_nH_m + n\text{-}H_2O \rightarrow n\text{-}CO + (m/2+n)H_2$$

$$CO+H_2O \rightarrow CO_2+H_2$$

with m, n integer numbers and m>2 and n>1.

Usually, it is not possible to convert the aromatic compounds and long chained carbon compounds in the reformer completely to the hydrogen rich gas, namely hydrogen, carbon dioxide, carbon monoxide, and water, so that the hydrogen rich gas leaving the reformer also comprises unconverted fuel compounds, the so-called fuel slip. This fuel slip is a problem for subsequent clean-up steps of the gas from sulphur compounds and other inorganic compounds since this fuel slip will act as a poison for the fuel cell downstream of the clean-up process.

To remove the fuel slip, it is known to cool the fuel stream so that the unwanted compounds of the fuel slip condense out and can be removed from the hydrogen rich gas. Disadvantageously, this method does not provide a total removal of the fuel slip and lowers the total efficiency of the system. Further, the fuel slip due to its poisoning character contributes to an unwanted premature aging of the fuel cell exposed to it.

It is desirable to provide an arrangement and a method for generating hydrogen from hydrocarbon fuels, which also in parallel provides the possibility to considerably reduce the amount of fuel slip in the hydrogen rich gas. It is also desirable to provide an arrangement and a method for generating hydrogen from hydrocarbon fuels, which can be used in an APU system.

Aspects of the present invention include an arrangement, an auxiliary power unit, as well as a method.

The present invention is based, according to an aspect thereof, on the idea to arrange a molten salt reactor, particularly a molten carbonate salt reactor, in connection with the fuel reformer, so that the hydrogen rich gas produced by the fuel reformer can be led into the molten salt reactor. The molten salt reactor can be arranged downstream of the fuel reformer, but it is also possible to integrate the molten salt reactor into the fuel reformer, or even arrange the molten salt reactor upstream of the fuel reactor. An upstream arrangement is in particular advantageous, if a fuel reformer with a recirculation possibility of the hydrogen gas into the fuel reformer for further catalytic conversion is used.

It is preferred to use molten carbonate salt, but also other suitable molten salts and/or molten salt mixtures can be used. A salt or a salt mixture is suitable in case it shows catalytic properties and is not harmful to the other components in the system. Other examples can be metal-nitride salts like $MeNO_3$, $MeSO_4$ etc. Chloride salts on the other hand should preferably not be used due to their corrosive and poisonous properties.

It is particularly advantageous to use a so called tank type molten salt reactor, where the molten salt is contained in a tank or container as a liquid which the hydrogen rich gas is brought into thereby enabling in a very efficient way the hydrogen rich gas molecules to come into contact with the molten salt molecules of the liquid.

In a further preferred embodiment, the molten salt reactor is designed as a so called plug flow reactor comprising a porous structure e.g. in form of a membrane, which is impregnated or penetrated with molten salt. Generally, in a plug flow reactor, one or more fluid reagents are pumped through a pipe or tube. The chemical reaction proceeds as the reagents travel through the tube. In this type of reactor, the changing reaction rate creates a gradient with respect to distance traversed i.e. at the inlet to the reactor the rate is very high, but as the concentrations of the reagents decrease and the concentration of the product(s) increases the reaction rate correspondingly slows down.

Molten salt reactors and especially molten carbonate salt reactors have proven useful for the destruction of organic compounds, since the molten salt behaves like a liquid and has the properties to split organic compounds into carbon monoxide, carbon dioxide, hydrogen and water. Additionally, molten carbonate salt is also able to react with sulphur and produces non-soluble and non-gaseous sulphur compounds that—depending on the mechanical design of the container—can easily be kept inside the molten salt container.

It is further advantageous that molten salt reactors are also known to water-gas shift the hydrogen rich gas, i.e. to further react carbon monoxide contained in the hydrogen rich gas with water to form carbon dioxide and hydrogen according to the water-gas shift reaction $CO+H_2O \rightarrow CO_2+H_2$. Thereby, also a first high temperature water-gas shift reactor for the removal of carbon monoxide can be replaced by the molten salt reactor.

These properties simplify the clean-up process by reducing the numbers of reactors necessary for cleaning the hydrogen rich gas. Additionally, carbonate salt such as the sodium carbonate is a very cheap substance, which can be easily replaced in case the salt gets too contaminated during operation of the fuel reformer by the sulphur compounds.

Whether the salt or the salt mixture is contaminated can be easily detected by sensing the conductivity and/or the potential of the molten salt or the molten salt mixture. The conductivity and/or the potential of the molten salt or the molten salt mixture depend on the amount of molten salt not contaminated with sulphur. Therefore, a contamination of the molten salt can be detected, in case the conductivity or the potential drops, significantly. In a further embodiment, the molten salt reactor further comprises a sensor, e.g. an ampere-meter, a voltmeter and/or resistance measuring device, sensing the contamination of the molten salt.

It is further necessary to keep the molten salt reactor in the range of the melting point temperature of the used salt or the used salt mixture. Preferably, the temperature of the molten salt reactor is above the melting point of the salt or the salt mixture, but a catalytic reaction of the salt with the sulphur compounds already takes place before the molten salt reactor reaches a temperature above the melting point. This is due to the fact that even before the temperature of the melting point has been reached some of the salt crystals are already molten and can react with the sulphur compounds. Therefore, the catalytic function of the salt or the salt mixture is only almost zero, if the salt is not melted completely.

In general, the melting point of the salts or the salt mixtures used in the reactor depends on the choice of the specific salt or on the choice of specific salts for the salt mixture used and their respective percentage (%) in said salt mixture. A salt mixture can have a melting point lower than the melting points of the individual salts which the salt mixture is composed of. For example sodium carbonate salt ($Na_2CO_3$) has a melting point of 851° C. and Lithium carbonate salt ($Li_2CO_3$) has a Melting point of 723° C., wherein an eutectic mixture of sodium carbonate salt and lithium carbonate salt (($LiZNa$)$_2CO_3$) has a melting point of 480° C. An eutectic mixture is a mixture at such proportions that the melting point of the mixture is as low as possible, and that furthermore all the constituents crystallize simultaneously at this temperature from molten liquid solution.

In a preferred embodiment of the invention, the molten salt reactor is placed after the fuel reformer and before the other clean-up steps of the system. Since the reactor has to be at a temperature that is above the melting point of the salt or salt mixture used therein, it is further advantageous to arrange it in close proximity to the fuel reformer and to use the waste heat of the fuel reformer generated during the fuel reforming process for heating of the reactor.

As mentioned above, the molten salt reactor can be arranged in many ways like a tank reactor in form of a container containing the salt and with an inlet and an outlet where the gas is pushed through the molten salt, or like a plug flow type reactor where the molten salt is trapped in a porous matrix structure by capillary forces and the gas is pushed through that porous structure. Such a porous structure can be made from a porous metal, such as porous Nickel, or any suitable porous ceramic, such as porous Lithium Aluminium Oxide.

If a molten salt reactor with a container is used, the container preferably is made from a material, which cannot be corroded by the molten salt. Such material can be one of stainless steel, nickel or ceramic compounds as for instance aluminium oxide. Further, both the inlet and the outlet of such a container can be made from the same or a different non-corrosive material as the container itself. If, alternatively, the salt is encapsulated within a suitable porous structure inside the reactor that traps the salt preferable by capillary forces, the salt is prevented from contacting any other parts of the reactor and/or reformer.

In a further preferred embodiment of the tank type reactor the molten salt reactor inlet is arranged below the molten salt level, wherein the molten salt reactor outlet is arranged above the molten salt level.

By using the inventive arrangement, the sulphur trap and a high temperature water-gas shift reactor can be replaced by the molten salt reactor, whereby the cleanup process of the hydrogen rich gas can be simplified.

In a further preferred embodiment, the inventive arrangement is used in an auxiliary power unit (APU) that can be used for instance for all kinds of vehicles. Vehicles can be land-driven vehicles such as cars, trucks or construction equipment as well as airplanes and all kinds of ships or boats.

Further advantages and preferred embodiments are described in the claims, the description and the FIGURE. Further, it should be noted that the scope of the claimed invention is defined by the appending claims only, and the preferred embodiment shown in the FIGURE is only exemplarily.

BRIEF DESCRIPTION OF THE DRAWING

In the following, the principal of the invention shall be explained in detail by a preferred embodiment shown in the FIGURE, which shows:

FIG. 1: a schematic drawing of a preferred embodiment of the inventive arrangement for generating hydrogen from hydrocarbon fuel as used in an APU system.

DETAILED DESCRIPTION

FIG. 1 shows a schematic drawing of a preferred embodiment of the inventive arrangement for generating hydrogen from hydrocarbon fuel as used in an APU system. In principal, an APU system 1 comprises a fuel reformer 2, a gas clean-up system 4 and a fuel cell 6. The fuel reformer 2 produces hydrogen rich gas 10 from hydrocarbon fuel 8, which is cleaned from unwanted by-products, such as sulphur and/or carbon monoxide in the gas clean-up reactor 4. The cleaned hydrogen rich gas 24 is then fed to the fuel cell 6 which in turn generates electric energy. These APU systems provide trucks, boats or other vehicles with electrical power for instance in situations when the main engine is off, as for example, when the truck is parked since the driver has to take a rest during the night. Dependent on what kind of fuel cell is used—low or high temperature fuel cells—the hydrogen rich gas 10 produced by reformer 2 has to pass through different cleaning steps for removing sulphur compounds and/or carbon monoxide. The cleaning-up steps are preferably performed in a series of water-gas shift reactors 4a, 4b, which operate at different temperatures, whereby at a level of carbon monoxide is reduced to the level necessary for the fuel cell. In the FIGURE two such water-gas shift reactors 4a, 4b are shown by way of example. The actual number of such reactors needed depends on the specific requirements of the individual application and may be less than, equal to or greater than two.

As explained above, the water-gas shift reaction taking place in the water-gas shift reactor is a chemical reaction in which carbon monoxide reacts with water to form carbon dioxide and hydrogen $CO+H_2O \rightarrow CO_2+H_2$. Therefore, this reaction can be used as a CO removal method from the hydrogen rich gas 10 produced by the fuel reformer 2. As the water-gas shift reaction is sensitive to temperature, with the tendency to shift towards reactants as temperature increases, the process is preferably used in two stages: stage one is a high temperature shift (HTS) at circa 350° C. and stage two a low temperature shift (LTS) at circa 190-210° C. Standard industrial catalysts for this process are iron oxide promoted with chromium oxide for the HTS step and copper on a mixed support composed of zinc oxide and aluminium oxide for the LTS shift step.

The fuel reformer 2 preferably comprises a catalyst usable for catalytic partial oxidation and/or steam reforming of the hydrocarbon fuel 8 fed to the reformer 2. By this catalytic process, hydrocarbon fuel 8 is reformed to hydrogen rich gas 10, mainly comprising carbon monoxide, hydrogen, carbon dioxide and water. The partial oxidation process takes place at temperatures between circa 700° C. and 1,000° C. It is a known fact that the heavier and longer the molecular chains of the hydrocarbon fuel 8 are, the more carbon monoxide and the lesser carbon dioxide are produced by this reforming process. Usually, the long chained carbon molecules and aromatic compounds of the hydrocarbon fuel 8 can not completely be converted in the reformer, with the consequence that a considerable amount of so called fuel slip of unconverted fuel compounds remains in the hydrogen rich gas 10. This fuel slip is a problem for the cleaning up-reactors 4a, 4b during which carbon monoxide is removed from the hydrogen rich gas 10 produced by reformer 2.

According to the invention, the APU 1 as shown in FIG. 1 additionally comprises a molten salt reactor 12, which is arranged downstream of the reformer 2 and before the water-shift gas reactors 4a, 4b. The molten salt reactor 12 can be designed as container 13, having a gas inlet 14 and a gas outlet 16. The container 13 contains a molten salt 20 up to a level 18. The gas inlet 14 is preferably arranged well below the level 18 of the molten salt 20 contained in the container 13 so that the hydrogen rich gas 10 produced by fuel reformer 2 can react with the molten salt 20 when pushed through the salt 20.

Since the molten salt 20 behaves like a liquid, the hydrogen rich gas 10 comprising unconverted compounds is, after entering the space in the container 13 with the molten salt 20, pushed through the molten salt 20 usually in form of gas bubbles of varying size, whereby organic compounds can be split into carbon monoxide, carbon dioxide, hydrogen and water. As also shown in FIG. 1, the molten salt reactor 12 is placed in close proximity to reformer 2, so that waste heat of reformer 2 can be used for heating the molten salt container 13 and to keep the temperature of the container at the desired level.

Additionally, the molten salt 20 reacts with sulphur contained in the hydrogen rich gas 10. This reaction produces non-soluble and non-gaseous sulphur-based compounds, which are easily kept inside the molten salt container 13. In the course of the operation of this hydrogen gas producing process, the molten salt 20, which can preferably be sodium carbonate, gets more and more contaminated with sulphur-based compounds and has to be replaced regularly in order to maintain the wanted efficiency of the process. Since sodium carbonate is a very cheap off-the-shelf substance, it can be replaced easily in case the molten salt 20 is too contaminated with sulphur-based compounds. Therefore, the molten salt container 10 is preferably arranged in an area of the APU that is easily reachable from the outside for such maintenance purposes.

Above the molten salt level 18 the cleaned hydrogen rich gas 22 can accumulate, from where it can be fed from the outlet 16 of the molten salt reactor 12 to the other gas clean-up reactors 4a, 4b.

However, even if the molten salt reactor also removes part of the carbon monoxide as it also water-gas shift reacts the hydrogen rich gas 10, the amount of removed carbon monoxide might not be sufficient for many fuel cell applications. In such cases, due to the fact that the hydrogen rich gas leaving the molten salt reactor 12 usually still comprises unwanted carbon monoxide in considerable amounts (besides the other main compounds of the hydrogen rich, namely gas carbon dioxide, hydrogen and water) and since there is the risk that carbon monoxide might poison fuel cell 6, the amount of carbon monoxide has to be further reduced to an acceptable level for the fuel cell used or, in the best case, (almost) completely be removed by a suitable number of subsequent clean-up reactors as shown in FIG. 1 (clean-up reactors 4a, 4b). This can be done e.g. by water-gas shift reactors, but also by carbon monoxide oxidiser or the like. After the removal of the major part of carbon monoxide, the almost carbon monoxide free hydrogen rich gas 24 can be fed to the fuel cell 6.

In fuel cell 6, electric energy is generated by oxidising hydrogen from the hydrogen rich gas 24 to water. This oxidation takes place by additionally supplying oxygen 26, e.g. in form of ambient air, to the fuel cell 6.

By using the molten salt reactor 12 or preferably the molten carbonate salt reactor, a sulphur trap and a high temperature water-gas shift reactor can be replaced by this reactor (as one unit) and, further, the fuel slip can be effectively removed by this reactor from the hydrogen rich gas 10 leaving the fuel reformer 2. Since particularly sodium carbonate is a very cheap substance, binds sulphur effectively, and, additionally, can be easily replaced, the inventive solution is simpler and cheaper than most solutions known from the state of the art. Since the fuel slip is effectively removed, the efficiency of the APU can be increased.

The invention claimed is:

1. Arrangement for generating hydrogen from hydrocarbon fuel comprising a fuel reformer for reforming hydrocarbon fuel to a hydrogen rich gas comprising at least hydrogen and carbon monoxide, and unconverted fuel compounds comprising a molten salt reactor arranged in connection with the fuel reformer for being supplied with the hydrogen rich gas from the fuel reformer, wherein the molten salt reactor is adapted to react with the unconverted fuel compounds and/or carbon monoxide and to supply cleaned hydrogen rich gas showing a lower amount of carbon monoxide and/or unconverted fuel compounds compared with the hydrogen rich gas supplied by the fuel reformer, wherein the molten salt reactor is a plug flow reactor having a porous structure which contains molten salt.

2. Arrangement according to claim 1, wherein the molten salt reactor is arranged downstream of the fuel reformer or upstream of the fuel reformer or designed as integrated part with the fuel reformer.

3. Arrangement according to claim 1, wherein the unconverted fuel compounds are aromatic compounds, and/or long chained carbon compounds and/or sulphur compounds.

4. Arrangement according to claim 1, wherein the molten salt is a pure salt or a salt mixture that has a lower melting point than the operating temperature of the molten salt reactor.

5. Arrangement according to claim 1, wherein the arrangement further comprises at least one further gas clean-up reactor for removing carbon monoxide from the hydrogen rich gas, wherein the further gas clean-up reactor is arranged downstream of the molten salt reactor.

6. Arrangement according to claim 5, wherein the gas clean-up reactor is a CO oxidizer.

7. Arrangement according to claim 1, wherein the molten salt reactor container and/or the inlet and/or the outlet are made from a non-corroding material.

8. Arrangement according to claim 1, wherein the molten salt reactor is arranged in close proximity to the fuel reformer, so that the molten salt reactor is heatable by waste heat of the fuel reformer.

9. Auxiliary power unit for providing electric energy to a consumer, comprising a fuel cell for producing electrical energy, wherein the fuel cell operates with hydrogen generated from hydrocarbon fuel, comprising an arrangement for generating hydrogen according to claim 1.

10. Auxiliary power unit according to claim 9, wherein the fuel cell is arranged downstream of the molten salt reactor.

11. Arrangement according to claim 1, further comprising at least one further gas clean-up reactor, the at least one further gas clean-up reactor being a sulphur trap, wherein the at least one further gas clean-up reactor is arranged downstream of the molten salt reactor.

12. Arrangement according to claim 1, further comprising at least one further gas clean-up reactor, the at least one further gas clean-up reactor being a water gas shift reactor, wherein the at least one further gas clean-up reactor is arranged downstream of the molten salt reactor.

13. Arrangement for generating hydrogen from hydrocarbon fuel comprising a fuel reformer for reforming hydrocarbon fuel to a hydrogen rich gas comprising at least hydrogen and carbon monoxide, and unconverted fuel compounds comprising a molten salt reactor arranged in connection with the fuel reformer for being supplied with the hydrogen rich gas from the fuel reformer, wherein the molten salt reactor is adapted to react with the unconverted fuel compounds and/or carbon monoxide and to supply cleaned hydrogen rich gas showing a lower amount of carbon monoxide and/or unconverted fuel compounds compared with the hydrogen rich gas supplied by the fuel reformer, wherein the molten salt reactor comprises molten salt, an inlet for supplying hydrogen rich gas to the molten salt, and an outlet for removing the cleaned hydrogen rich gas, the inlet and the outlet being arranged in such a way that the hydrogen rich gas is pushed through the molten salt, wherein the molten salt is a pure salt or a salt mixture that has a lower melting point than the operating temperature of the molten salt reactor, and wherein the molten salt reactor further comprises a sensor for sensing the contamination of the molten salt or of the molten salt mixture by sensing an electric conductivity or an electric potential of the molten salt or of the molten salt mixture.

14. Method for generating hydrogen from hydrocarbon fuel by supplying hydrocarbon fuel to a fuel reformer for producing a hydrogen rich gas comprising at least hydrogen, carbon monoxide and unconverted fuel compounds, comprising supplying the hydrogen rich gas to a tank-type molten salt reactor in which the molten salt is contained, in a tank or container as a liquid into which the hydrogen rich gas is supplied, the molten salt reactor containing a molten salt or salt mixture and being a plug flow reactor having a porous structure which contains molten salt, and causing the carbon monoxide and/or the unconverted fuel compounds contained in the hydrogen rich gas to react with the molten salt or salt mixture, wherein the hydrogen rich gas is pushed through the molten salt or salt mixture, to supply cleaned hydrogen rich gas showing a lower amount of carbon monoxide and/or unconverted fuel compounds compared with the hydrogen rich gas supplied to the fuel reformer.

15. Method according to claim 14, wherein the unconverted fuel compounds are aromatic compounds, and/or long chained carbon compounds and/or sulphur compounds.

16. Method according to claim 14, wherein the molten salt is or the molten salt mixture contains, a carbonate salt.

17. Method according to claim 14, further comprising the step of further providing at least one further gas clean-up reactor for removing carbon monoxide from the hydrogen rich gas, wherein cleaned hydrogen rich gas leaving, the molten salt reactor is supplied to the further gas clean-up reactor.

18. Method according to claim 14, wherein the molten salt reactor is operated at a temperature that is above the melting point of salt or salt mixture.

19. Method according to claim 14, further comprising the step of leading waste heat from the fuel reformer to the molten salt reactor for heating the molten salt, reactor.

* * * * *